(12) United States Patent
Johnson

(10) Patent No.: US 9,535,257 B2
(45) Date of Patent: Jan. 3, 2017

(54) MULTIPLE COLLIMATOR UNIT

(71) Applicant: Goodrich Corporation, Charlotte, NC (US)

(72) Inventor: James B. Johnson, Medford, MA (US)

(73) Assignee: Goodrich Corporation, Charlotte, NC (US)

( * ) Notice: Subject to any disclaimer, the term of this patent is extended or adjusted under 35 U.S.C. 154(b) by 177 days.

(21) Appl. No.: 14/226,970

(22) Filed: Mar. 27, 2014

(65) Prior Publication Data

US 2015/0277135 A1 Oct. 1, 2015

(51) Int. Cl.
*G02B 27/30* (2006.01)
*G02B 27/62* (2006.01)

(52) U.S. Cl.
CPC .............. *G02B 27/30* (2013.01); *G02B 27/62* (2013.01)

(58) Field of Classification Search
CPC .......... G02B 27/30; G02B 27/62; G02B 27/34
See application file for complete search history.

(56) References Cited

U.S. PATENT DOCUMENTS

| 4,200,803 | A | 4/1980 | Becker et al. | |
|---|---|---|---|---|
| 2005/0212951 | A1* | 9/2005 | Miyata | G02B 7/04 348/345 |
| 2012/0305781 | A1* | 12/2012 | Jansen | G02B 27/30 250/363.04 |

FOREIGN PATENT DOCUMENTS

WO WO-2013102555 A1 7/2013

OTHER PUBLICATIONS

Extended European Search Report for European Patent Application No. EP15160797.5, dated Jul. 15, 2015.

* cited by examiner

*Primary Examiner* — Joseph P Martinez
(74) *Attorney, Agent, or Firm* — Locke Lord LLP; Scott D. Wofsy; Arpita G. Buesing

(57) ABSTRACT

A collimator unit includes an on-axis collimator tube fixedly attached to at least two off-axis collimator tubes. The off-axis collimator tubes are angled relative to the on-axis collimator tube. Each collimator tube can include a lens, a light source, and a target placed at the lens' focal point. The collimator tubes can be positioned within a housing such that the on-axis collimator tube is coaxial and centered with respect to the housing.

15 Claims, 2 Drawing Sheets

MULTIPLE COLLIMATOR UNIT

BACKGROUND OF THE INVENTION

1. Field of the Invention

The present disclosure relates to calibrating optical devices, and more particularly to collimators used for calibrating optical devices.

2. Description of Related Art

When calibrating an optical device to view a target, either the target is placed a sufficient distance away or a collimator is used to optically simulate a target at the distance. Collimators are a critical tool within optical laboratories for measuring focus, image field flatness, boresighting, imaging resolution, and clocking. However, traditional collimators have several potential drawbacks against use in the field including expense, fragility, small field of view, size, and weight.

Traditionally, for a wide field of view camera or a modular/reconfigurable camera, a single full aperture collimator is used for alignment and measurement. For large fields of view the collimator must be tilted to give the effect of a field point spaced infinitely far away. Further, the angle between the camera and collimator must be physically adjusted between each measurement to accomplish off-axis optical testing at the field points of interest.

Such conventional methods and systems have generally been considered satisfactory for their intended purpose. However, there is still a need in the art for improved collimators. The present disclosure provides a solution for this need.

SUMMARY OF THE INVENTION

A collimator unit includes an on-axis collimator tube fixedly attached to at least two off-axis collimator tubes. The off-axis collimator tubes are angled relative to the on-axis collimator tube. Each collimator tube can include a lens, a light source, and a target placed at the lens' focal point.

The collimator tubes can be mounted to a housing such that the on-axis collimator tube is coaxial and centered with respect to the housing. The angle between the two off-axis collimator tubes and the on-axis collimator tube can be fixed with respect to the housing. In certain embodiments, the angle between the off-axis collimator tubes and the on-axis collimator tube can be adjustable. Further, the angle between each off-axis collimator tube and the on-axis collimator tube can be symmetrical.

The on-axis collimator tube can be positioned to focus a center of a focal plane while the off-axis collimator tubes can be positioned to focus on off-center field points. In certain embodiments, the off-axis collimator tubes can be positioned to focus respective edges of the focal plane.

The number of off-axis collimator tubes can be varied such that one embodiment may include one on-axis collimator tube and three off-axis collimator tubes surrounding the on-axis collimator tube. An additional embodiment may include one on-axis collimator tube and four off-axis collimator tube surrounding the on-axis collimator tube. In each embodiment, the off-axis collimator tubes can be evenly spaced surrounding the on-axis collimator tube.

A method of calibrating an optical device is disclosed. The method includes simultaneously displaying target images on a focal plane from each collimator tube of a collimator unit including at least two collimator tubes fixedly attached together.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
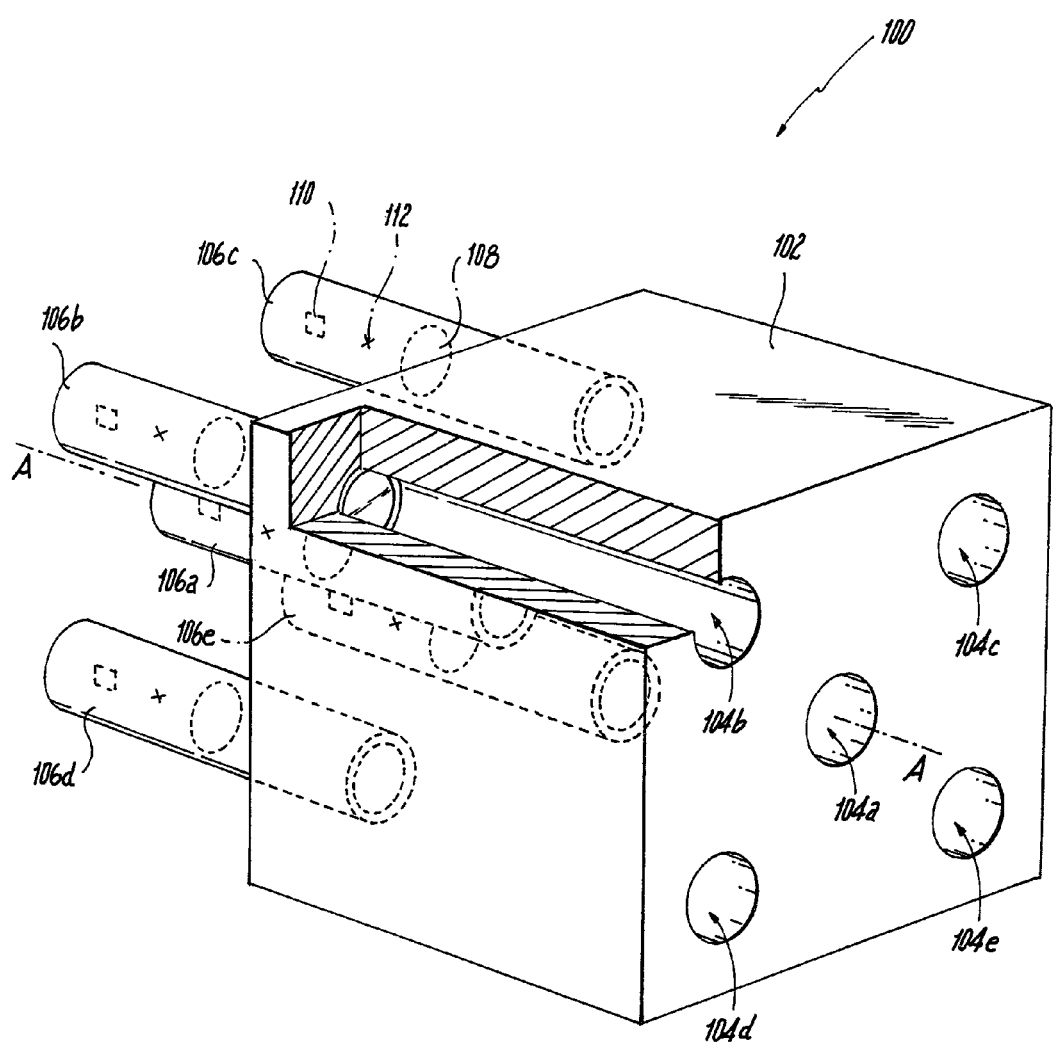
FIG. 1 is a perspective view of an exemplary embodiment of a collimator unit constructed in accordance with the present disclosure showing five collimator tubes in a common housing.

Reference will now be made to the drawings wherein like reference numerals identify similar structural features or aspects of the subject disclosure. For purposes of explanation and illustration, and not limitation, a partial view of an exemplary embodiment of a multiple collimator unit in accordance with the disclosure is shown in FIG. 1 and is designated generally by reference character 100. Other embodiments of the multiple collimator unit in accordance with the disclosure, or aspects thereof, are provided in FIGS. 2-4, as will be described.

With reference to FIG. 1, a multiple collimator unit 100 is shown. The unit 100 can be a portable unit consisting of multiple collimators positioned at various angles to simulate a wide field of view target. As shown in FIG. 1, the unit includes five collimator tubes 106a-106e fixedly attached together. More specifically, one on-axis collimator tube 106a is fixedly attached to four off-axis collimator tubes 106b-106e. The off-axis collimator tubes 106b-106e are angled relative to the on-axis collimator tube 106a. The angle of the off-axis collimator tubes 106b-106e relative to the on-axis collimator tube 106a is the same for each off-axis collimator tube 106b-106e and is based on the optical device being calibrated. It will be understood by those skilled in the art, the angle of the off-axis collimator tubes 106b-106e is defined by the altitude angle.

As shown, the unit 100 can include a housing 102 having five bores 104a-104e and a respective collimator tube 106a-106e disposed within each bore 104a-104e. Each collimator tube 106a-106e can be threaded into the respective bore 104a-104e of the housing 102. The on-axis collimator tube 106a is positioned coaxial with the housing axis A. The on-axis collimator tube 106a is also centered within the housing 102. The off-axis collimator tubes 106b-106e can be positioned surrounding the on-axis collimator tube 106a. Housing 102 with bores 104a-104e is exemplary only and any other suitable fixture or method can be used to mount collimator tubes together.

Figure 2:
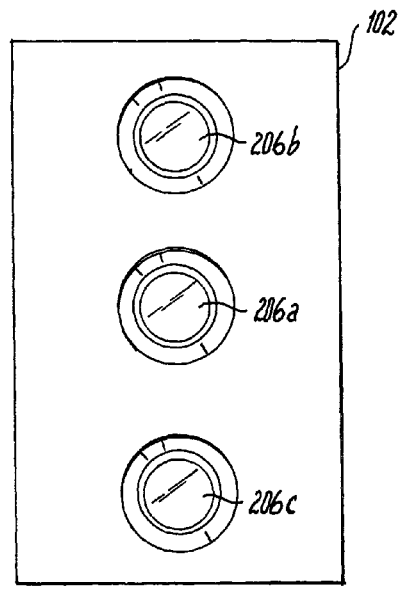
FIG. 2 is a top plan view of another exemplary embodiment of a collimator unit with three collimator tubes.
Figure 3:
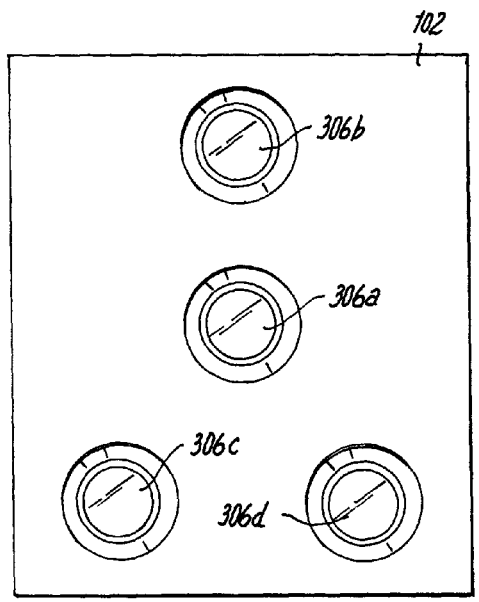
FIG. 3 is a top plan view of another exemplary embodiment of a collimator unit with four collimator tubes.

Each collimator tube 106a-106e includes a lens 108, a light source 110 and a target 112 placed at the lens' focal point (shown schematically). Those skilled in the art will understand that each collimator tube 106a-106e is shown and described as including a lens, however, depending on the optical device each collimator tube 106a-106e may include lens(es), mirror(s), diffractive optical element(s) or combinations of these elements. The light source 110 may be a light emitting diode (LED), a fiber optic light, or a similar type of light source. The target 112 may include a pinhole, or the like. The number of collimator tubes within each housing can be varied and reconfigured. FIG. 1 illustrates one on-axis collimator tube 106a and four off-axis collimator tubes 106b-106e. FIG. 2 illustrates one on-axis collimator tube 206a and two off-axis collimator tubes 206b, 206c. FIG. 3 illustrates one on-axis collimator tube 306a and three off-axis collimator tubes 306b-306d. The off-axis collimator tubes 106b-106e, 206b-206c, 306b-306d are shown evenly spaced circumferentially surrounding the on-axis collimator tube 106a, 206a, 306a in the respective configurations. However, the arrangement of the off-axis collimator tubes surrounding the on-axis collimator tubes can be varied based on the optical device being calibrated.

The outer diameters of the collimator tubes 106a-106e are fixed within the housing 102. In embodiments, the angles between the off-axis collimator tubes 106b-106e and the on-axis collimator tubes 106a are also fixed with respect to the housing. In embodiments, the unit 100 allows for the collimator tubes 106a-106e to be removed from the housing 102 and collimator tubes configured for different focal lengths or wavelengths to be installed. As the angle between the collimator tubes is fixed with respect to the housing, the newly installed collimator tubes will return to same angle positioning defined by the housing. The angle between the off-axis and on-axis collimator tubes 106b-106e, 106a can optionally be adjustable prior to calibration of an optical device.

With traditional collimators, to calibrate over a wide field of view, data is collected for a single field angle and then the collimator and/or lens is adjusted to capture additional field angles. Since the unit 100 contains multiple collimators 106a-106e, the unit 100 is able to capture multiple field points of a wide field of view camera simultaneously without the need to move, tilt or realign the unit 100 or camera. Unit 100 is designed such that the beam footprint of each individual collimator tubes 106a-106e intersects at a single point in the collimated space. Each collimator tube 106a-106e will project light that corresponds to a unique location on the image plane. The resulting data is the same as that derived by traditional techniques that require tilting the lens or single collimator. The unit 100 allows for the entire data set for a large field of view to be captured in a single image.

Figure 4:
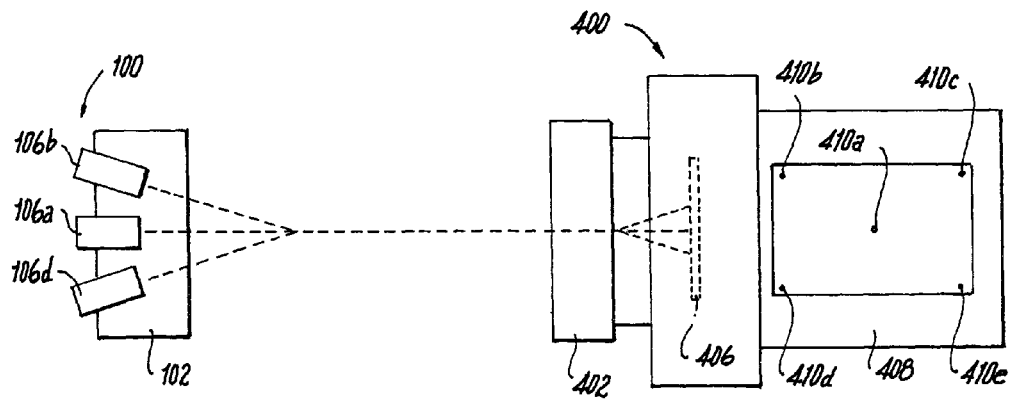
FIG. 4 is a schematic side view illustrating the image returned using the collimator unit of FIG. 1 with a camera.

As shown in FIG. 4, a schematic view of a camera 400 is shown. A collimator unit 100 is used to calibrate the camera lens 402. The unit 100 is positioned in front of the camera lens 402. With five collimator tubes 106a-106e, the unit 100 simulates a wide field of view target by simultaneously displaying the target images 410a-410e from each respective collimator tube 106a-106e on a focal plane 406 of the lens 402. The on-axis collimator tube 106a is positioned to focus the center of a focal plane while off-axis collimator tubes 106b-106e are positioned to focus on off center field points. In this manner, each collimator tube 106a-106e will calibrate a portion of the entire field of view. The image at the focal plane 406 at each portion can be displayed onto a display screen 408 of the camera 400. The sharpness of the image indicates if the lens 402 is properly calibrated. If not properly calibrated, the sharpness of the image indicates what adjustments are needed to correct for measuring focus, image field flatness, boresighting, imaging resolution, and clocking. As shown on the display screen 408 of the camera 400, the on-axis collimator tube 106a focuses at the center 410a of the focal plane 406. Each of the off-axis collimator tubes 106b-106e focuses on or near edges 410b-410e of the focal plane 406, e.g., the corners.

With continued reference to FIG. 4, each collimator tube 106a-106e illustrates the respective targets in focus. However, if the lens were out of focus or titled at an angle, one or more of the images 410b-410e will appear at different sizes and/or distances from the center 410a. Simple software algorithms available in several programming environments known in the art will detect this change in spot size variation. A user or automated system may then readjust the focal plane angles until all images 410b-410e appear the same size and same distance from the center 410a. Those skilled in the art will readily appreciate that the display screen 408 is optional, and is shown in FIG. 4 for purposes of schematic clarity.

For illustration purposes the unit 100 is shown to test the lens of the camera 400. It is understood that the unit 100 may be used to calibrate various optical devices. For example, unit 100 may be used to calibrate an aerospace camera system by projecting the targets to determine the cameras' imaging capability, where the camera will be used to illustrate the immediate surroundings for a pilot.

The methods and systems of the present disclosure, as described above and shown in the drawings, provide for a field servicing collimator unit with superior properties including simulating a wide field of view of a target. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A collimator unit comprising:
   an on-axis collimator tube fixedly attached to at least two off-axis collimator tubes within a housing, wherein the off-axis collimator tubes are angled relative to the on-axis collimator tube, wherein each collimator tube comprises:
   a lens defining a focal point;
   a light source; and
   a target placed at the focal point,
   and wherein each collimator tube is removable from the housing and is replaceable with a collimator tube having one of a different focal length and a different wavelength.

2. The collimator unit of claim 1, wherein the angle between each off-axis collimator tube and the on-axis collimator tube is symmetrical.

3. The collimator unit of claim 1, wherein the collimator tubes are positioned within the housing such that the on-axis collimator tube is coaxial and centered with respect to the housing.

4. The collimator unit of claim 3, wherein the angle between the at least two off-axis collimator tubes and the on-axis collimator tube is fixed with respect to the housing.

5. The collimator unit of claim 1, wherein the on-axis collimator tube is positioned to focus a center of a focal plane and the off-axis collimator tubes are positioned to focus on off-center field points.

6. The collimator unit of claim 5, wherein the off-axis collimator tubes are positioned to focus on a respective edge of the focal plane.

7. The collimator unit of claim 1, including one on-axis collimator tube and three off-axis collimator tubes surrounding the on-axis collimator tube.

8. The collimator unit of claim 1, including one on-axis collimator tube and four off-axis collimator tube surrounding the on-axis collimator tube.

9. The collimator unit of claim 1, wherein the angle between the off-axis collimator tubes and the on-axis collimator tube is adjustable.

10. The collimator unit of claim 1, wherein the light source is an incoherent light source.

11. The method of calibrating an optical device, the steps comprising:

simultaneously displaying target images on a focal plane from each collimator tube of a collimator unit including at least two collimator tubes fixedly attached together, wherein each collimator tube comprises:

a lens defining a focal point;
a light source; and
a target placed at the focal point,
and wherein each collimator tube is removable from a housing and is replaceable with a collimator tube having one of a different focal length and a different wavelength.

12. The method of claim 11, wherein the collimator unit includes three collimator tubes, such that one collimator tube is on-axis and two collimator tubes are off-axis.

13. The method of claim 12, wherein the two off-axis collimator tubes are angled relative to the on-axis collimator tube.

14. The method of claim 12, wherein the on-axis collimator tube is positioned to focus a center of a focal plane and the off-axis collimator tubes positioned to focus on off-center field points.

15. The method of claim 14, wherein the off-axis collimator tubes is positioned to focus on a respective edge of the focal plane.

* * * * *